May 1, 1928.
W. J. HUGHES
1,668,207
METHOD AND MEANS FOR SUPPLYING SALT SOLUTION TO A WATER SOFTENING APPARATUS USING BASE EXCHANGE SILICATES AS THE WATER SOFTENING AGENT
Filed June 15, 1925
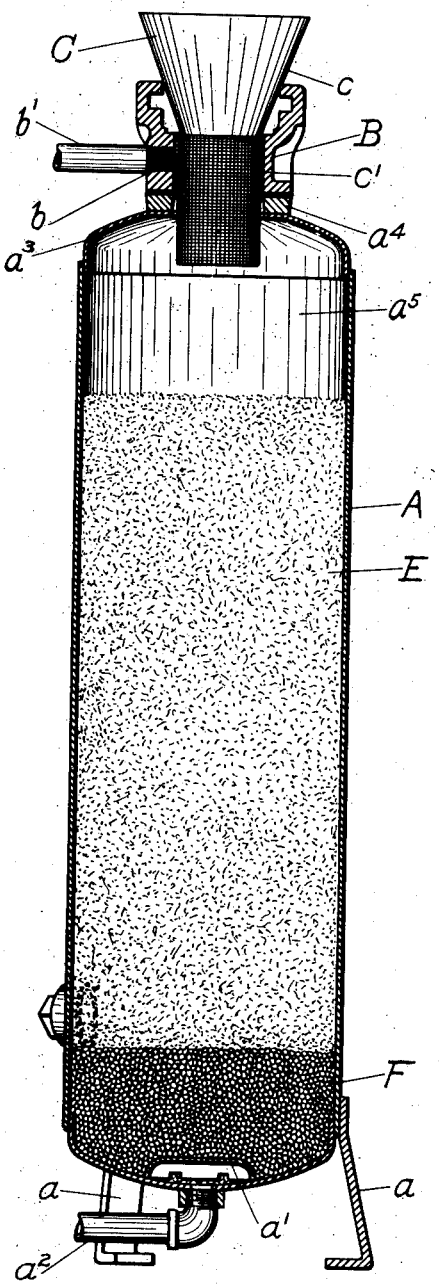
INVENTOR
Walter J. Hughes
BY
Walter A. Knight
ATTORNEY Patented May 1, 1928.

1,668,207

UNITED STATES PATENT OFFICE.

WALTER J. HUGHES, OF FORT WAYNE, INDIANA, ASSIGNOR, BY MESNE ASSIGNMENTS, TO THE PERMUTIT COMPANY, OF NEW YORK, N. Y., A CORPORATION OF DELAWARE.

METHOD AND MEANS FOR SUPPLYING SALT SOLUTION TO A WATER-SOFTENING APPARATUS USING BASE-EXCHANGE SILICATES AS THE WATER-SOFTENING AGENT.

Application filed June 15, 1925. Serial No. 37,204.

My invention relates to a method of and means for introducing a regenerating salt solution into a water softening apparatus in which base exchange silicates are used as the water softening agent; and means for carrying this method into effect so that said salt solution may be applied to the top of the bed for the purpose of regenerating the base exchange silicates when their water softening capacity has been exhausted.

Various means have been employed for supplying the regenerating agent to the bed of base exchange silicates when it has become exhausted of its water softening capacity and requires regeneration. Generally some salt pot, tank, or other container for salt was used, to which water was admitted, and when the brine was formed it was conveyed by suitable pipes to the top of the water softener casing and passed downwardly into the bed of base exchange silicates. While this is satisfactory practice for industrial softeners it was found undesirable and expensive for small softeners for domestic use.

Sometimes the salt pot was built onto the top of the softener container, thus eliminating piping and connections but still involving objectionable bulk, weight, substantial expense and labor in getting into the container for any purpose.

Sometimes the salt was poured directly into the container and allowed to dissolve there and pass through the bed but that method frequently resulted in lack of uniformity in regeneration of the bed, and consumed an excessive amount of salt.

The principal object of the present invention is to provide a cheap and thoroughly efficient and economical method of and means for dissolving the salt and introducing the brine into the top of the water softener, without bulky or heavy additional apparatus or such is difficult to remove.

A means of carrying my invention into use is illustrated in the accompanying drawing, in which is shown in axial section a water softener employing base exchange silicates as a water softening medium with the cover plate off the hand-hole head, and a funnel with a foraminous metal spout closed at its lower end with a foraminous material, placed in the opening so that water running into the container through the water inlet passes through the spout, dissolves the salt and the brine flows into the container upon the bed of silicates.

Referring now to the drawing A is the casing adapted to rest on legs $a$ and having a slotted strainer $a^1$ and a pipe $a^2$ connected to the center of a bulging bottom head. To the bulging top head $a^3$ is secured, in any suitable way as by the weld-ring $a^4$, by bolts (not shown) or in any other convenient manner, a hand-hole head B, with a horizontal inlet orifice $b$ into which is screwed pipe $b^1$.

As shown in the drawing, the cover plate has been removed and a funnel C rests in the opening. The flaring portion $c$ is of the usual sheet metal construction but the spout portion $c^1$ is preferably made large and constructed of suitable perforated material the bottom end being closed with like material. The funnel is filled with salt and the water enters through the pipe $b^1$, playing directly upon the foraminous spout, passing through it and quickly dissolving the salt inside it. The brine runs down through the open space $a^5$ and upon the bed E of the base exchange silicates which rests upon the usual supporting gravel F.

When the required quantity of salt has been converted into brine in the manner above described the funnel is removed and the cover plate (not shown) replaced in position.

I claim as my invention and desire to secure by Letters Patent of the United States:

In combination with a water softening apparatus in which is a bed of base exchange silicates, a hand-hole head substantially at the top of said apparatus and having its hand-hole opening substantially at its top and its water inlet substantially at its side, and a removable funnel with spout closed at its lower end, said spout being foraminous and adapted to seat in said hand-hole head when the cover plate is removed in such a manner as to bring said spout into the path of water flowing into said apparatus through said inlet.

In testimony whereof I have hereunto set my hand.

WALTER J. HUGHES.